(12) United States Patent
Kipnis et al.

(10) Patent No.: US 10,673,615 B2
(45) Date of Patent: Jun. 2, 2020

(54) COMPUTATION USING SOMEWHAT HOMOMORPHIC ENCRYPTION

(71) Applicant: Cisco Technology, Inc., San Jose, CA (US)

(72) Inventors: Aviad Kipnis, Efrat (IL); Alon Shaltiel, Jerusalem (IL); Yair Fodor, Petah-Tikva (IL)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 16/004,846

(22) Filed: Jun. 11, 2018

(65) Prior Publication Data

US 2019/0182027 A1    Jun. 13, 2019

(30) Foreign Application Priority Data

Dec. 10, 2017   (IL) .......................................... 256234

(51) Int. Cl.
| | |
|---|---|
| *H04L 9/30* | (2006.01) |
| *H04L 29/06* | (2006.01) |
| *H04L 9/00* | (2006.01) |
| *H04L 9/06* | (2006.01) |
| *H04L 9/14* | (2006.01) |

(52) U.S. Cl.
CPC ............ *H04L 9/008* (2013.01); *H04L 9/0631* (2013.01); *H04L 9/14* (2013.01); *H04L 9/3093* (2013.01); *H04L 63/0428* (2013.01); *H04L 2209/04* (2013.01)

(58) Field of Classification Search
CPC . H04L 9/008; H04L 9/30; H04L 63/04; H04L 2209/04
See application file for complete search history.

(56) References Cited

U.S. PATENT DOCUMENTS

| | | | |
|---|---|---|---|
| 2011/0110525 A1* | 5/2011 | Gentry | ................... H04L 9/0822 380/285 |
| 2013/0216044 A1 | 8/2013 | Gentry et al. | |

(Continued)

OTHER PUBLICATIONS

Boyle, et. al., "Breaking the Circuit Size Barrier for Secure Computation Under DDH," In Annual Cryptology Conference, Springer Berlin Heidelberg, Sep. 2, 2016, 47 pages.

(Continued)

*Primary Examiner* — Wasika Nipa (57) ABSTRACT

In one embodiment, data for use by a processor is stored in a memory. A network interface communicates over a network with a second device. At a processor, a Somewhat Homomorphic Encryption (SHE) of a plurality of secret shares is generated. The SHE of the plurality of secret shares is sent to the second device. The following is performed in a loop: a first result of a homomorphic exclusive-or operation performed by the second device on the SHE is received, a SHE of the first result is performed, yielding a second result, a SHE of the second result is performed yielding a third result, the third result is transmitted to the second device, and a final SHE result is received from the second device. The received final SHE result is decrypted in order to produce a final Somewhat Homomorphically Decrypted (SHD) output. The final SHD output is then output. Related methods, systems, and apparatus are also described.

20 Claims, 4 Drawing Sheets

(56) References Cited

U.S. PATENT DOCUMENTS

| | | | |
|---|---|---|---|
| 2013/0329883 A1 | 12/2013 | Tamayo-Rios | |
| 2014/0185794 A1* | 7/2014 | Yasuda | H04L 9/008 380/28 |
| 2015/0358153 A1 | 11/2015 | Gentry | |
| 2016/0105402 A1* | 4/2016 | Soon-Shiong | H04L 63/0428 713/164 |

OTHER PUBLICATIONS

Damgård, et al., "Multiparty Computation From Somewhat Homomorphic Encryption," In Advances in Cryptology—CRYPTO 2012, pp. 643-662. Springer Berlin Heidelberg, Aug. 2012.

Damgård, et al., "Practical Covertly Secure MPC for Dishonest Majority—or: Breaking the SPDZ Limits," "This article is based on an earlier article ESORICS 2013, pp. 1-18 Springer LNCS 8134, 2013" Date: last revised Aug. 20, 2013, 45 pages.

Wikipedia, "Garbled Circuit," https://en.wikipedia.org/w/index.php?title=Garbled_circuit&oldid=797719356, Aug. 28, 017, 6 pages.

Wikipedia, "Secure Multi-Party Computation," https://en.wikipedia.org/w/index.php?title=Secure_multi-party_computation&oldid=798072529, Aug. 30, 2017, 10 pages.

\* cited by examiner

COMPUTATION USING SOMEWHAT HOMOMORPHIC ENCRYPTION

PRIORITY CLAIM

This application claims priority to Israeli Application No. 256234 filed Dec. 10, 2017, the entirety of which is incorporated herein by reference.

TECHNICAL FIELD

The present disclosure generally relates to somewhat homomorphic encryption schemes.

BACKGROUND

Homomorphic encryption schemes are described in cryptographic literature. However, in practice, such schemes are considered impractical and inefficient, and therefore are typically neglected. Fully homomorphic encryption schemes, at the present time, tend to require heavy computational resources, hence, the reputation of such schemes as being impractical, in contrast to other schemes which require the ciphertext to be decrypted, the calculations then performed on plaintext and the results of the calculations re-encrypted. Homomorphic encryption schemes have the advantage that calculations may be performed on ciphertext data without a need to decrypt the ciphertext, perform the calculations on plaintext, and then to re-encrypt the result of the calculations.

Homomorphic encryption schemes that can perform only a limited number of homomorphic operations are referred to in the art as "Somewhat Homomorphic Encryption schemes" (SHE).

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, data for use by a processor is stored in a memory. A network interface communicates over a network with a second device. At a processor, a Somewhat Homomorphic Encryption (SHE) of a plurality of secret shares is generated. The SHE of the plurality of secret shares is provided (sent) to the second device. The following is performed in a loop: a first result of a homomorphic exclusive-or operation performed by the second device on the SHE is obtained (received), a SHE of the first result is performed, yielding a second result, a SHE of the second result is performed yielding a third result, the third result is provided (transmitted) to the second device, and a final SHE result is obtained (received) from the second device. The received final SHE result is decrypted in order to produce a final Somewhat Homomorphically Decrypted (SHD) output. The final SHD output is then output. Related methods, systems, and apparatus are also described.

Example Embodiments

Figure 1:
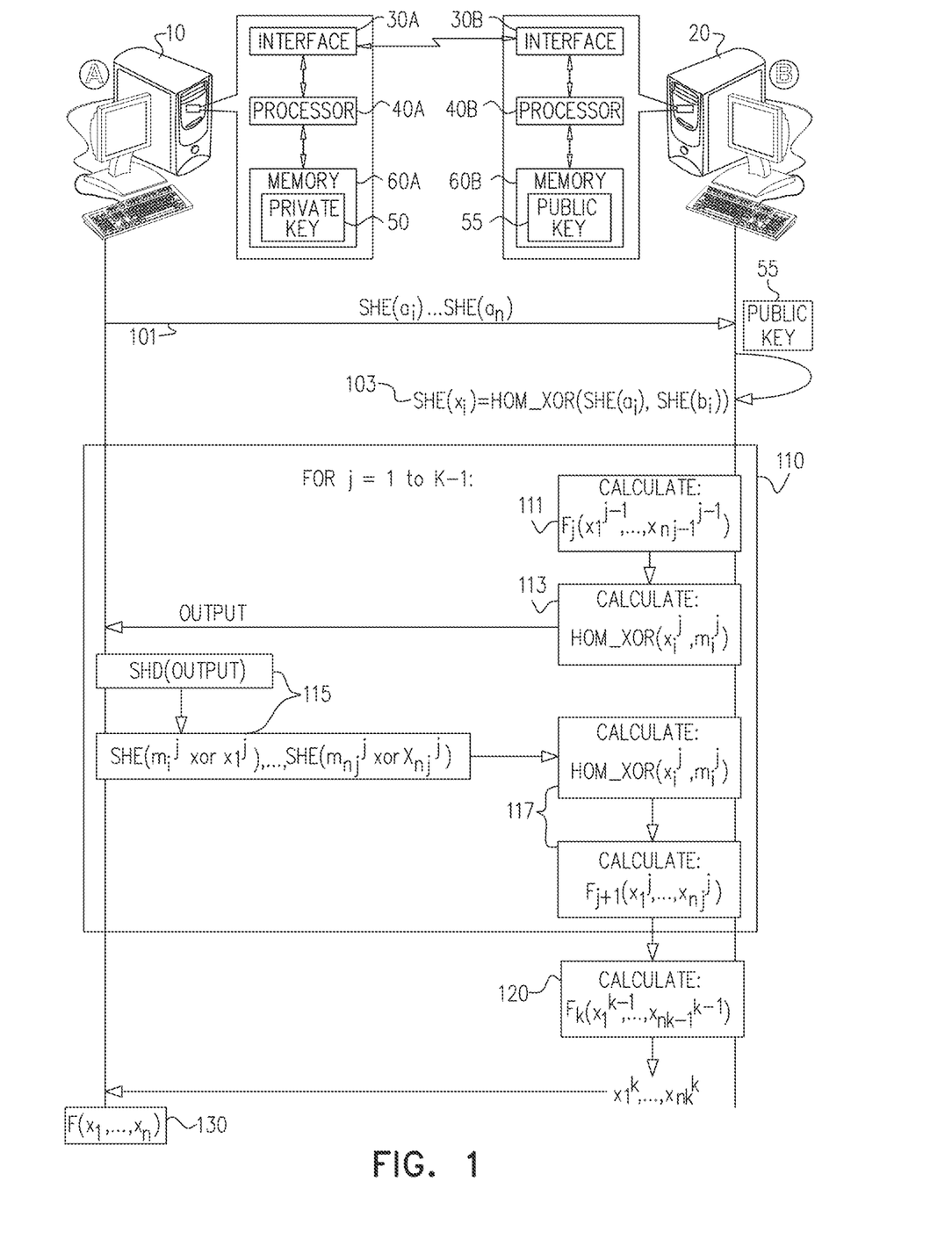
FIG. 1 is a depiction of a system and method for Somewhat Homomorphic Encryption constructed and operative in accordance with an embodiment of the present disclosure.

Reference is now made to FIG. 1 which is a depiction of a system and method for Somewhat Homomorphic Encryption (SHE) constructed and operative in accordance with an embodiment of the present disclosure.

Somewhat Homomorphic Encryption schemes are typically more efficient and require fewer computing resources than fully homomorphic encryption schemes. In embodiments described herein, some SHE schemes are utilized in order to secure a two party computation protocol for calculation of a function performed by a general circuit. The general circuit may be represented as a Boolean circuit, as will be amplified below.

Embodiments described herein are for an asymmetric encryption scheme (hereinafter, "the scheme") having a public key and a private key. The scheme encrypts plain text values on a single bit by single bit basis. A Somewhat Homomorphic Encryption of a bit b by the scheme is denoted by SHE(b). As is known in the art, SHE schemes introduce noise during the encryption process (a homomorphic encryption scheme which operates without introducing noise is typically referred to in the art as a "Fully Homomorphic Encryption" (FHE) scheme).

The term "providing" is used herein to include "sending" or "transmitting" and the term "obtaining" is used herein to include "receiving".

In homomorphic encryption schemes, noise is usually a small term added into a ciphertext during the encryption process. The noise term is typically a small integer in a scheme based on integers, or a small polynomial in a scheme based on polynomials, and so forth. Those skilled the art will appreciate that a term which is considered "small" is dependent on the security and properties of a particular encryption scheme. Noise is added in order to increase security in the scheme, and is typically random (or pseudo-random). Decryption functions may not correctly decrypt ciphertext if the noise is greater than a maximum value, which is dependent on the encryption scheme in use. A homomorphic operation may increase the noise, and accordingly, may limit the number of such homomorphic operations that may be performed prior to reducing the noise.

A Somewhat Homomorphic Decryption function, SHD corresponds to encryption function SHE, such that decryption of a cipher text c is denoted by SHD(c). It is the case in the scheme that SHD(SHE(b))=b.

The Somewhat Homomorphic Encryption scheme, as described herein, also has two public homomorphic operators: HOM_XOR and HOM_AND. Each of these operators receives two encrypted values, and outputs a third encrypted value, such that:

$$SHD(HOM\_XOR(SHE(b_1), SHE(b_2))) = b_1 \text{ xor } b_2$$

$$SHD(HOM\_AND(SHE(b_1), SHE(b_2))) = b_1 \text{ and } b_2$$

Furthermore, if there are more than two inputs to the HOM_XOR and to the HOM_AND operators, then:

$$HOM\_AND(a,b,c) = HOM\_AND(HOM\_AND(a,b),c)$$

$$HOM\_XOR(a,b,c) = HOM\_XOR(HOM\_XOR(a,b),c)$$

As noted above, some SHE schemes are utilized in order to secure a two party computation protocol for calculation of a function performed by a general circuit. If a multiplicative depth (to be defined below) of input lines of the general circuit exceeds a value of a parameter, d, the Somewhat Homomorphically Encrypted value loses its meaning (that is to say, trying to decrypt the Somewhat Homomorphically Encrypted value will produce a meaningless bit). Accordingly, the SHE encryption function is somewhat homomorphic with respect to parameter d, if:

$$\text{SHD}(\text{HOM\_AND}(\text{SHE}(b_1), \ldots, \text{SHE}(b_n))) = (b_1 \text{ and } b_2 \text{ and } \ldots \text{ and } b_n) \quad (1)$$

for n (the number of homomorphic and operations) not greater than d+1 (i.e. n≤d+1).

It is appreciated that if n is greater than d, then equality cannot be assured for equation (1).

The Somewhat Homomorphic Encryption scheme can correctly handle up to d such homomorphic and operations because of the noise added to the plain text values when the HOM_AND operator is applied to the ciphertext. This effectively results in d (and hence, as will be discussed below, multiplicative depth) being an upper bound to the noise.

It is also noted that for the HOM_XOR operator, equation (2) (below) will remain valid even for values of n much greater than d:

$$\text{SHD}(\text{HOM\_XOR}(\text{SHE}(b_1), \ldots, \text{SHE}(b_n))) = (b_1 \text{ xor } b_2 \text{ xor } \ldots \text{ xor } b_n) \quad (2)$$

Those of skill in the art will note that there is a theoretical that there is an upper bound to the value of n dependent on an exponential function of d, however, in practice n may be viewed as without such an upper bound.

The system of FIG. 1 is now described. A first device 10, may comprise a general-purpose computer or other appropriate computing device, and will also be referred to below and in FIG. 1, for convenience sake, as A. The first device A 10 is in communication with a second device 20. The second device 20 will also be referred to below and in FIG. 1, for convenience sake, as B. Either one or both of the first device A 10 and the second device B 20 may be a desk top computer, or other general-purpose computer, such as, but not limited to, a hand held computing device, such as a tablet or smart phone.

The first device A 10 and the second device B 20 comprise respective interfaces 30A, 30B over which said communication occurs between the devices 10, 20. The interfaces 30A, 30B may comprise wireless network interfaces, wired network interfaces, or other appropriate communications interfaces, as are known in the art.

The first device A 10 comprises a first processor 40A which performs various Somewhat Homomorphic operations, as detailed herein, using a private key 50, which is stored in a memory 60A. The second device B 20 comprises a second processor 40B which performs various Somewhat Homomorphic operations, as detailed herein, using a public key 55, which is stored in a memory 60B.

The memory 60A, 60B may comprise a Random Access Memory (RAM), where machine readable instructions may reside during runtime, and a secondary memory. Alternatively, the memory 60A, 60B, may comprise a hard disk drive and/or a removable storage drive, representing a floppy diskette drive, a magnetic tape drive, a compact disk drive, a flash drive, etc., or a nonvolatile memory where a copy of the machine readable instructions may be stored. The secondary memory may also include ROM (read only memory), EPROM (erasable, programmable ROM), EEPROM (electrically erasable, programmable ROM), and so forth.

Typically, both the processor 40A and the second processor 40B comprise computer processors, which may be programmed in software to carry out the functions that are described herein. The software may be downloaded to either of the processors in electronic form, over a network, for example. Alternatively or additionally, the software may be provided on tangible, non-transitory storage media, such as optical, magnetic, or electronic memory media. Further alternatively or additionally, some or all of the described processing functions may be performed by special-purpose or programmable digital logic circuits.

For efficient processing, the processors 40A, 40B may comprise dedicated hardware logic circuits, in the form of an application-specific integrated circuit (ASIC), field programmable gate array (FPGA), or full-custom integrated circuit, or a combination of such devices. Alternatively or additionally, some or all of the functions of the processors 40A, 40B may be carried out by a programmable processor, such as a microprocessor or digital signal processor (DSP), under the control of suitable software. The software may be downloaded to the processor in electronic form, over a network, for example. Alternatively or additionally, the software may be stored on tangible storage media, such as optical, magnetic, or electronic memory media.

Figure 2:
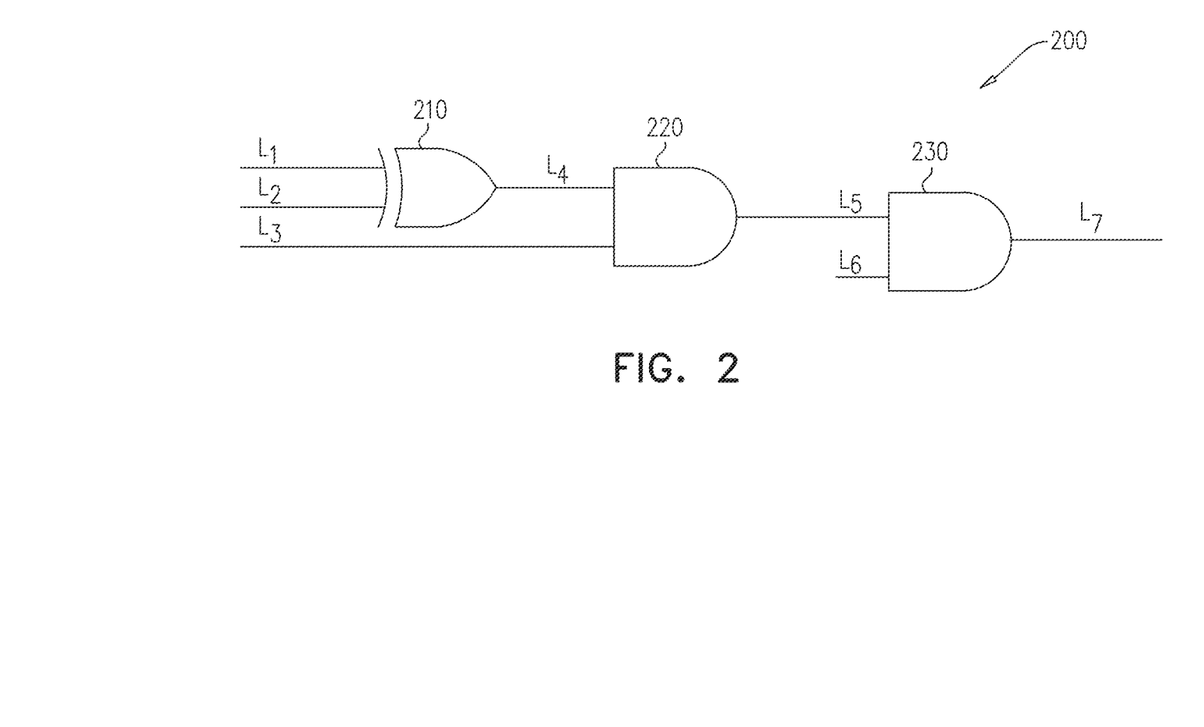
FIG. 2 is an exemplary Boolean circuit for use in the system of FIG. 1.

Reference is now made to FIG. 2, which is an exemplary Boolean circuit for use in the system of FIG. 1.

The Multiplicative Depth (MD) of an input line, Line, that is not outputted from another gate in the Boolean circuit, initially satisfies MD(Line)=0. Since output lines from a first Boolean operation may serve as input lines into a next Boolean operation, by recursion, the multiplicative depth of an output of an xor gate of two input lines, $L_1$ and $L_2$ is the maximum of the multiplicative depth values of the inputs. i.e. $\text{MD}(L_1 \text{ xor } L_2) = \max(\text{MD}(L_1), \text{MD}(L_2))$, as will be explained below. The multiplicative depth of an output line of an and gate will be: $\text{MD}(L_1 \text{ and } L_2) = \text{MD}(L_1) + \text{MD}(L_2) + 1$. This effectively counts the number of AND operations in an encrypted value; for example, two encrypted values which have no AND operations in either of them, which are then AND-ed together will then give a value of 1, since they are themselves AND-ed.

For a circuit C 200, MD(C) is defined as the maximum multiplicative depth of all of the lines in circuit C 200, which is the maximum multiplicative depth of the lines in an output of circuit C 200.

The circuit C 200 comprises a XOR gate 210, a first AND gate 220, and a second AND gate 230. There are two input lines into the XOR gate 210, $L_1$ and $L_2$. As mentioned above, the multiplicative depth of an input line that is not outputted from another gate in the Boolean circuit, such as lines $L_1$ and $L_2$, is zero. Accordingly, the multiplicative depth of an output line, such as output line $L_4$, from the XOR gate 210 is calculated as follows:

$$\text{MD}(L_4) = \text{MD}(L_1 \text{ xor } L_2) = \max(\text{MD}(L_1), \text{MD}(L_2))$$

$$\text{MD}(L_1 \text{ xor } L_2) = \max(0,0) = 0$$

Input line $L_4$ for the first AND gate 220 is identical to output line $L_4$ of the XOR gate 210, and therefore retains its calculated multiplicative depth, i.e., 0.

The multiplicative depth of the output line, such as output line $L_5$, from the first AND gate 220, is, accordingly calculated based on input lines $L_3$ and $L_4$ as follows:

$$MD(L_5)=MD(L_3 \text{ and } L_4)=MD(L_3)+MD(L_4)+1$$

$$MD(L_3 \text{ and } L_4)=0+0+1=1$$

Output line $L_5$, having a multiplicative depth of 1, is input into the second AND gate 230. Second AND gate 230 also receives input line $L_6$, which has a multiplicative depth of 0, for the reasons explained above. The second AND gate 230 outputs output line $L_7$ having a multiplicative depth of 2 (i.e. $MD(L_5 \text{ and } L_6)=1+0+1=2$). Thus, for the circuit C 200, $MD(C)=2$, which, as noted above, is the maximum multiplicative depth of the output lines of circuit C 200.

Returning now to the discussion of FIG. 1, embodiments of the system of FIG. 1 described herein are operative for any Somewhat Homomorphic Encryption scheme which satisfies the following criteria:

The SHE scheme may be secure against chosen plain text attacks, as is known in the art;

The SHE scheme may enable secure masking of Somewhat Homomorphic Encrypted data, such that for two parties A 10 and B 20, A knows the private key and B 20 knows only the public key. A 10 selects a circuit C with outputs denoted by $c_1, \ldots c_m$. A 10 either shares circuit C with B 20, or. Alternatively, A 10 notifies B 20 that C is a function already known to B 20. B 20 selects n bits $b_1 \ldots b_n$. B 20 encrypts the n bits $b_1 \ldots b_n$ with SHE and calculates an output value of C of $SHE(b_1) \ldots SHE(b_n)$. B 20 can mask the output results such that when A 10 receives the masked output results, $\text{mask}(SHE(c_n))$, A 10 cannot learn anything about $b_1 \ldots b_n$; and B 20 can remove the masking from re-encryption of the decrypted results such that $\text{demask}(SHE(SHD(\text{mask}(SHE(c_i)))))$ is a newly re-encrypted Somewhat Homomorphic Encryption of $c_i$. Removing of the masking by B 20 will result in noise being added to the plaintext value without exceeding the d, the upper bound of the noise.

SHE schemes based on learning with errors (LWE) and ring-learning with errors (r-LWE), among other SHE schemes, satisfy the above requirements.

In one embodiment, SHE calculations and noise reduction operations are incorporated into a 2-device protocol. A noise reduction operation is performed as part of a random masking of the ciphertext such that secrecy of the processed information is maintained.

As is known in the art, in order to determine a value of a function, F, having n bits of input and m bits of output, i.e., $F: \{0,1\}^n \rightarrow \{0,1\}^m$, F is considered to be, and calculated as a composition of circuits: $F_k(F_{k-1} \ldots (F_2 (F_1)) \ldots )$. Accordingly, $$F_1: \{0,1\}^{n_0} \rightarrow \{0,1\}^{n_1};$$

$$F_2: \{0,1\}^{n_1} \rightarrow \{0,1\}^{n_2};$$

...;

$$F_k: \{0,1\}^{n_{k-1}} \rightarrow \{0,1\}^{n_k}, n_0=n, n_k=m.$$

It is appreciated that above C designated a circuit, and here, F designates an abstract function. (However, as is known, some circuit C may be used to calculated the function F).

Outputs of a circuit $F_i$ in the function F are inputs to a following circuit, $F_{i+1}$. Additionally, each $F_i$ is required to be bounded by d, lest the noise come to exceed d, as explained above.

A method of using the SHE scheme is described now. If the SHE scheme is somewhat homomorphic with respect to parameter d, a value of $F_i$ may be calculated as follows:

Let A 10 and B 20 be two parties which calculate $F(x_1, \ldots, x_n)$ where $x_1, \ldots, x_n$ are secrets to be encrypted using the SHE scheme described herein. A 10 holds secret shares (comprising individual bits) $a_1, \ldots, a_n$. B 20 holds secret shares (comprising individual bits) $b_1, \ldots, b_n$. For all i: $a_i$ xor $b_i=x_i$.

A 10 generates an asymmetric SHE scheme which is somewhat homomorphic with respect to parameter d, and sends $SHE(a_1), \ldots, SHE(a_n)$ and the public key to B 20 (step 101).

B 20 uses the public key 55 to generate encrypted values $SHE(b_i)$.

B 20, in step 103, generates an encrypted value of $x_i$ for all values of i, by calculating $SHE(x_i)=HOM\_XOR(SHE(a_i), SHE(b_i))$. $x_i^0$ is set to $SHE(x_i)$. By way of a reminder, the HOM_XOR operation does not add noise to its output. In further stages, the function F is divided into its component portions: $F_1 \ldots F_k$, and noise which has been introduced will be reduced at a later stage of operations, as seen below. Accordingly, the upper bound, d, of the noise is not exceeded.

For a loop 110, starting at 1 and proceeding to k−1, where a current iteration of the loop is j:

B 20 calculates $F_j(x_1^{j-1}, \ldots, x_{nj-1}^{j-1})$ to determine $(x_1^j, \ldots, x_{nj}^j)$. Note that noise in $(x_1^j, \ldots, x_{nj}^j)$ is now bounded by $MD(F_j)$ which is bounded by d (step 111).

B 20 masks the determined $(x_1^j, \ldots, x_{nj}^j)$ with random encrypted bits $m_1^j, \ldots, m_{n_j}^j$ by calculating $HOM\_XOR(x_i^j, m_i^j)$ for all i, and sends a resulting output, $HOM\_XOR(x_i^j, m_i^j)$ for all i, to A 10 (step 113).

A 10 then uses the private key 50 in order to decrypt the resulting output and thus removing the noise which has been added until this point. A 10 then uses the private key 50 in order to re-encrypt the result of the decryption to determine $SHE(m_1^j \text{ xor } x_1^j), \ldots, SHE(m_{nj}^j \text{ xor } x_{nj}^j)$ (Step 115). Step 115 corresponds to the "noise reduction" described above. This is so because the re-encrypted result is re-having no noise. Noise may be later introduced when HOM_AND operations are performed, as explained above.

Step 115 concludes with A 10 sending the re-encrypted result, $SHE(m_1^j \text{ xor } x_1^j), \ldots, SHE(m_{nj}^j \text{ xor } x_{nj}^j)$ back to B 20.

B 20 uses the HOM_XOR operator once again, as described above, in order to remove the mask and obtain $(x_1^j, \ldots, x_{nj}^j)$ with reduced noise to be used as an input for a following round of the loop, $F_{j+1}$ (step 117).

B 20 calculates $F_k(x_1^{k-1}, \ldots, x_{nk-1}^{k-1})$ to obtain $(x_1^k, \ldots, x_{nk}^k)$, and sends $(x_1^k, \ldots, x_{nk}^k)$ to A 10 without masking (step 120).

A 10 then uses private key 50 to decrypt $(x_1^k, \ldots, x_{nk}^k)$ in order to obtain $F(x_1, \ldots, x_n)$ (step 130).

Once A 10 has obtained $F(x_1, \ldots, x_n)$, A 10 may publish its obtained result, making $F(x_1, \ldots, x_n)$ available to others (whether to a single recipient or to multiple recipients). Alternatively, A 10 may send the result $F(x_1, \ldots, x_n)$ back to B 20. Still further, A 10 may keep the result, $F(x_1, \ldots, x_n)$, as a secret.

Figure 3:
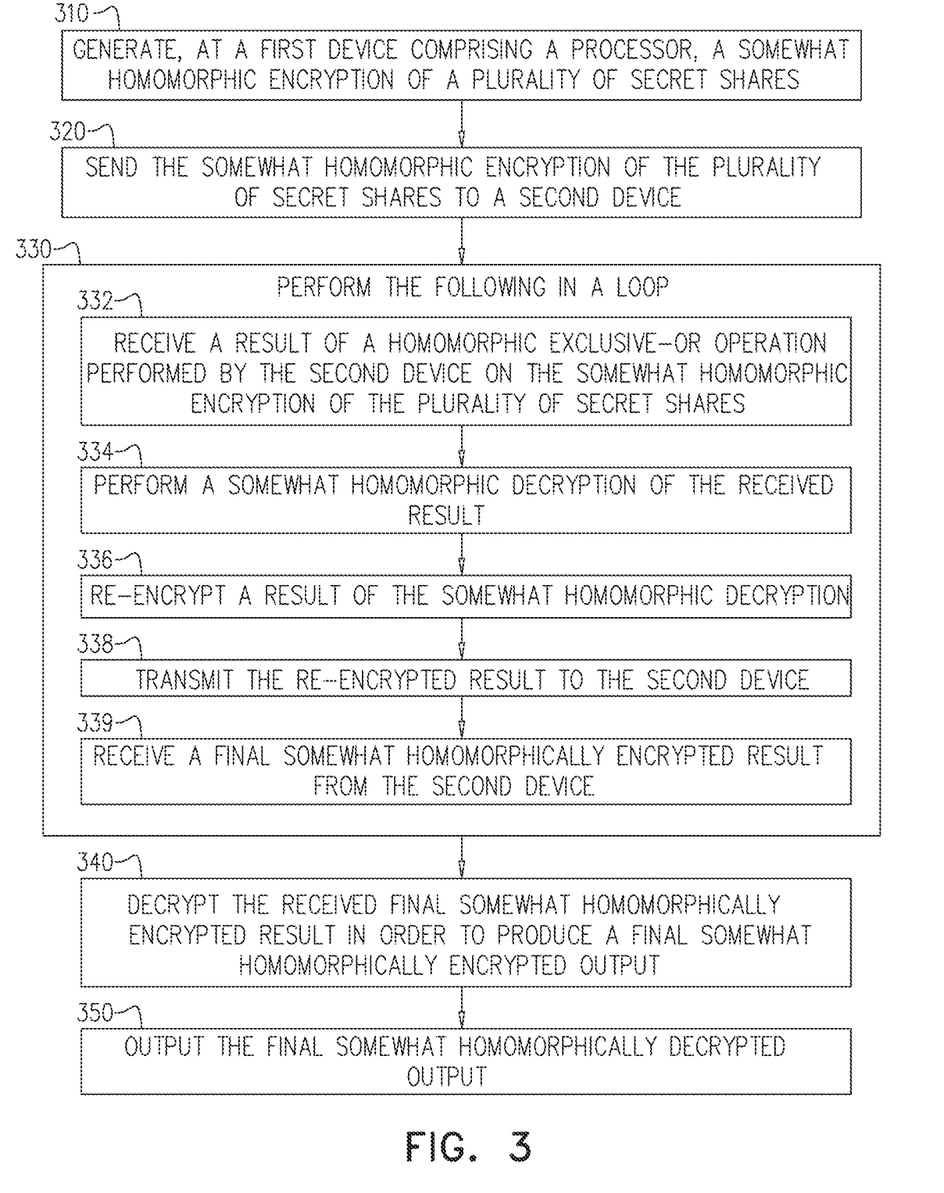
FIG. 3 is a flow chart of a method of operation for one embodiment of the system of FIG. 1.

Reference is now made to FIG. 3, which is a flow chart of a method of operation for one embodiment of the system of FIG. 1. At step 310, a first device comprising a processor, a memory operative to store data used by the processor and a network interface operative to enable network communications with the second device, generates a Somewhat Homomorphic encryption of a plurality of secret shares. The Somewhat Homomorphic Encryption of the plurality of secret shares are sent to the second device (step 320).

Step 330 comprises a series of sub-steps (steps 332-339) which are performed in a loop until each of the component portions into which function f (described above with reference to FIG. 1) has been divided has been iterated through the loop:

A result of a homomorphic exclusive-or operation performed by the second device on the Somewhat Homomorphic Encryption of the plurality of secret shares is received (step 332);

A Somewhat Homomorphic Decryption of the received result is performed (step 334);

A result of the Somewhat Homomorphic Decryption is re-encrypted (step 336);

The re-encrypted result is transmitted to the second device (step 338); and

A final Somewhat Homomorphically Encrypted result is received from the second device (step 339).

At step 340 the received final Somewhat Homomorphically Encrypted result is decrypted in order to produce a final Somewhat Homomorphically Encrypted output. Finally, the final Somewhat Homomorphically Decrypted output is output by the processor.

Figure 4:
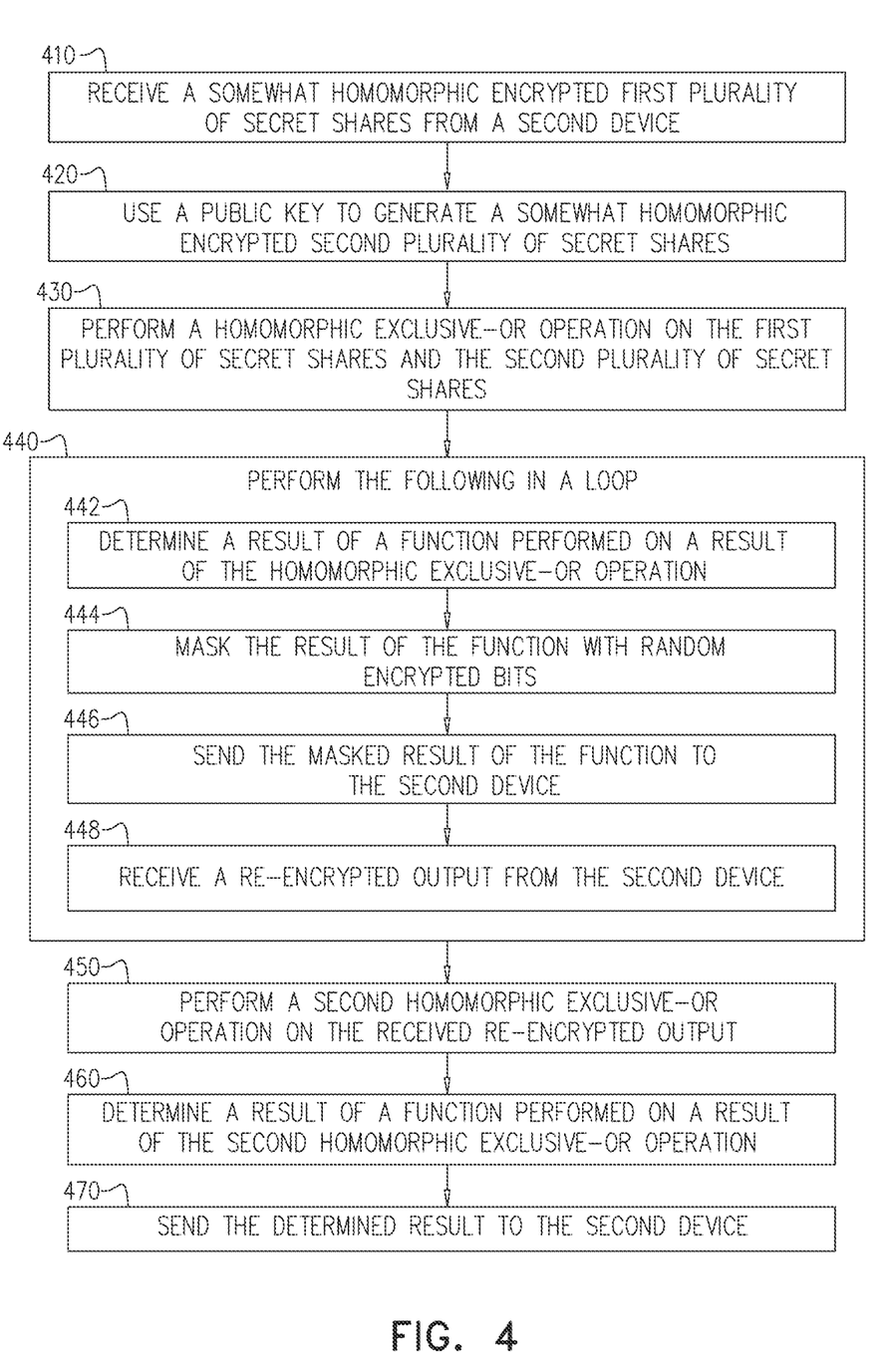
FIG. 4 is a flow chart of a method of operation for a second embodiment of the system of FIG. 1.

Reference is now made to FIG. 4, which is a flow chart of a method of operation for a second embodiment of the system of FIG. 1. At step 410, a Somewhat Homomorphic Encrypted first plurality of secret shares is received at a first device from the second device.

At step 420, a public key is used by the processor to generate a Somewhat Homomorphic Encrypted second plurality of secret shares.

At step 430, a homomorphic exclusive-or operation is performed on the first plurality of secret shares and the second plurality of secret shares.

Step 440 is a series of steps (steps 442-448) which are performed in a loop until each of the component portions into which function f (described above with reference to FIG. 1) has been divided has been iterated through the loop:

A result of a function performed on a result of the homomorphic exclusive-or operation is determined (step 442);

The result of the function is masked with random encrypted bits (step 444).

The masked result of the function is sent to the second device (step 446).

A re-encrypted output is received from the second device (step 448).

At step 450 a second homomorphic exclusive-or operation is performed on the received re-encrypted output.

At step 460 a result of a function performed on a result of the second homomorphic exclusive-or operation is determined.

At step 470, the determined result is sent to the second device.

It will be apparent to one of ordinary skill in the art that one or more of the components of the first device 10 of FIG. 1 and the second device 20 of FIG. 1 may not be included in the system of FIG. 1 and/or other components may be added included in the system of FIG. 1 as is known in the art. The depictions of the first device 10 of FIG. 1 and the second device 20 of FIG. 1 are provided as examples of a possible platform that may be used, and other types of platforms may be used as is known in the art. One or more of the steps described above may be implemented as instructions embedded on a computer readable medium and executed on either or both of the first device 10 of FIG. 1 and the second device 20 of FIG. 1. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that those functions enumerated above may be performed by any electronic device capable of executing the above-described functions.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A device comprising:
   a memory operative to store data used by a processor of a first device;
   a network interface operative to communicate over a network with a second device; and
   the processor configured to:
      generate a Somewhat Homomorphic Encryption of a plurality of secret shares;
      provide the Somewhat Homomorphic Encryption of the plurality of secret shares to the second device;
      perform the following in a loop:
         obtain a first result of a homomorphic exclusive-or operation performed by the second device on the Somewhat Homomorphic Encryption of the plurality of secret shares;
         perform a Somewhat Homomorphic Decryption of the first result, yielding a second result;
         perform a Somewhat Homomorphic Encryption of the second result yielding a third result;

transmit the third result to the second device; and
obtain a final Somewhat Homomorphically Encrypted result from the second device;
decrypt the final Somewhat Homomorphically Encrypted result in order to produce a final Somewhat Homomorphically Decrypted output; and
output the final Somewhat Homomorphically Decrypted output.

2. The device of claim 1, wherein the processor is configured to publish the output.

3. The device of claim 1, wherein the processor is configured to provide the output to the second device.

4. The device of claim 1, wherein the processor is configured to keep the output as a secret.

5. The device of claim 1, wherein the processor is configured to use a Somewhat Homomorphic Encryption scheme that includes a learning with errors Somewhat Homomorphic Encryption scheme.

6. The device of claim 1, wherein the processor is configured to use a Somewhat Homomorphic Encryption scheme that includes a ring-learning with errors Somewhat Homomorphic Encryption scheme.

7. The device of claim 1, wherein the processor is configured to reduce noise associated with the first result when the processor performs the Somewhat Homomorphic Encryption of the second result.

8. The device of claim 1 wherein noise in the first result is bounded by a multiplicative depth of a circuit associated with the plurality of secret shares.

9. A device comprising:
a memory operative to store data used by a processor of a first device;
a network interface operative to communicate over a network with a second device; and
the processor configured to:
    obtain a Somewhat Homomorphic Encrypted first plurality of secret shares from the second device;
    use a public key to generate a Somewhat Homomorphic Encrypted second plurality of secret shares;
    perform a homomorphic exclusive-or operation on the first plurality of secret shares and the second plurality of secret shares yielding a first result;
    perform the following in a loop:
        perform a function on the first result yielding a second result;
        mask the second result with random encrypted bits yielding a masked result;
        provide the masked result to the second device;
        obtain a re-encrypted output from the second device; and
        perform a second homomorphic exclusive-or operation on the re-encrypted output yielding a third result;
    perform a second function on the third result yielding a fourth result; and
    provide the fourth result to the second device.

10. The device of claim 9, wherein the processor is configured to obtain a final Somewhat Homomorphically Decrypted output from the second device.

11. The device of claim 9, wherein the processor is configured to use a Somewhat Homomorphic Encryption scheme that includes a learning with errors Somewhat Homomorphic Encryption scheme.

12. The device of claim 9, wherein the processor is configured to use a Somewhat Homomorphic Encryption scheme that includes a ring-learning with errors Somewhat Homomorphic Encryption scheme.

13. The device of claim 9, wherein the re-encrypted output obtained from the second device is obtained after the second device has performed a noise reduction operation prior to re-encrypting the re-encrypted output.

14. The device of claim 9, wherein the homomorphic exclusive-or operation adds noise to the first result, the noise being bounded by a multiplicative depth of a circuit associated with the plurality of secret shares.

15. The device of claim 9, wherein the function performed on the first result is comprised of Boolean operations.

16. The device of claim 9, wherein the processor is configured to perform a homomorphic exclusive-or operation on the second result in order to mask the result of the function.

17. The device of claim 9, wherein the processor is configured to perform a second homomorphic exclusive-or operation in order to unmask encrypted bits comprised in the re-encrypted output.

18. A method comprising:
storing data in a memory, the data for use by a processor of a first device;
communicating over a network with a second device via a network interface; and
at a processor:
    generating a Somewhat Homomorphic Encryption of a plurality of secret shares;
    providing the Somewhat Homomorphic Encryption of the plurality of secret shares to the second device;
    performing the following in a loop:
        obtaining a first result of a homomorphic exclusive-or operation performed by the second device on the Somewhat Homomorphic Encryption of the plurality of secret shares;
        performing a Somewhat Homomorphic Decryption of the first result, yielding a second result;
        performing a Somewhat Homomorphic Encryption of the second result yielding a third result;
        providing the third result to the second device; and
        obtaining a final Somewhat Homomorphically Encrypted result from the second device;
    decrypting the final Somewhat Homomorphically Encrypted result in order to produce a final Somewhat Homomorphically Decrypted output; and
    outputting the final Somewhat Homomorphically Decrypted output.

19. The method of claim 18, wherein one of:
the first device publishes the output;
the first device sends the output to the second device; and
the first device keeps the output as a secret.

20. The method of claim 18, wherein a Somewhat Homomorphic Encryption scheme used by the first device comprises one of:
a learning with errors Somewhat Homomorphic Encryption scheme; and
a ring-learning with errors Somewhat Homomorphic Encryption scheme.

* * * * *